United States Patent
Hidaka et al.

(10) Patent No.: US 10,972,026 B2
(45) Date of Patent: Apr. 6, 2021

(54) MOTOR CONTROLLING DEVICE

(71) Applicant: AISIN SEIKI KABUSHIKI KAISHA, Kariya (JP)

(72) Inventors: Seiji Hidaka, Toyota (JP); Kazuki Sugimori, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 106 days.

(21) Appl. No.: 16/321,569

(22) PCT Filed: Mar. 24, 2017

(86) PCT No.: PCT/JP2017/011927
§ 371 (c)(1),
(2) Date: Jan. 29, 2019

(87) PCT Pub. No.: WO2018/029888
PCT Pub. Date: Feb. 15, 2018

(65) Prior Publication Data
US 2020/0252012 A1 Aug. 6, 2020

(30) Foreign Application Priority Data
Aug. 8, 2016 (JP) .................................. 2016-155683

(51) Int. Cl.
*H02P 6/28* (2016.01)
*H02M 7/5387* (2007.01)
(Continued)

(52) U.S. Cl.
CPC .......... *H02P 6/28* (2016.02); *H02M 7/53871* (2013.01); *H02P 6/14* (2013.01); *H02P 29/024* (2013.01)

(58) Field of Classification Search
CPC .. H02P 6/14; H02P 8/36; H02P 29/024; H02P 27/05; B60L 3/00; H01L 121/66
See application file for complete search history.

(56) References Cited

U.S. PATENT DOCUMENTS 5,357,181 A 10/1994 Mutoh et al.
2013/0264974 A1* 10/2013 Suzuki ................... H02P 27/08
318/139

(Continued)

FOREIGN PATENT DOCUMENTS

JP 2003-284374 A 10/2003
JP 2005-160136 A 6/2005

OTHER PUBLICATIONS

Parasiliti, F. et al., "A Novel Solution for Phase Current Sensing in PWM-VSI Based AC Drives", Retrieved from the Internet: URL:http://citeseerx.ist.psu.deu/viewdoc/download?doi=10.1.1.517.5339&rep=rep1&type=pdf, XP055582637, Aug. 27, 2001, 10 pages.

(Continued)

*Primary Examiner* — Said Bouziane
(74) *Attorney, Agent, or Firm* — Oblon, McClelland, Maier & Neustadt, L.L.P.

(57) ABSTRACT

A motor controlling device includes a high-side first switching element corresponding to each phase of a three-phase brushless motor, a low-side second switching element corresponding to each phase, a shunt resistor disposed between and connected to the second switching element and a grounding line, and a power controlling section for controlling the first switching element and the second switching element. The device further includes a decision section configured to effect abnormality decision based on a sum of values of currents flowing in the shunt resistors of all the phases acquired by using the power controlling section to switch OFF the first switching element of any one phase whose duty ratio is found equal to or greater than a threshold value for a predetermined period and also to switch ON the second switching element of the same one phase for the predetermined period.

2 Claims, 4 Drawing Sheets

(51) Int. Cl.
*H02P 6/14* (2016.01)
*H02P 29/024* (2016.01)

(56) References Cited

U.S. PATENT DOCUMENTS

2013/0334995 A1 12/2013 Kuroda
2016/0299184 A1* 10/2016 Lee .................. B60L 3/0069

OTHER PUBLICATIONS

International Search Report dated Jun. 13, 2017 in PCT/JP2017/011927 filed on Mar. 24, 2017.

* cited by examiner

MOTOR CONTROLLING DEVICE

CROSS-REFERENCE TO RELATED APPLICATIONS

This application is the U.S. national stage of International Patent Application No. PCT/JP2017/011927, filed on Mar. 24, 2017, which claims priority to Japanese Patent Application No. 2016-155683, filed on Aug. 8, 2016. The entire contents of each of the above applications are hereby incorporated by reference herein in entirety.

TECHNICAL FIELD

This disclosure relates to a motor controlling device for controlling power supply to respective phases of a three-phase brushless motor.

BACKGROUND ART

As such motor controlling device, Patent Document 1 discloses a technique in which an inverter device for controlling a multiple-phase AC generator comprises switching elements provided on its high side and its low side respectively and two current sensors are incorporated in three wires connecting the inverter device and a motor generator.

In this Patent Document 1, a failure in the current sensors is detected through comparison between measured current values acquired by the plurality of current sensors and also an arrangement is provided for enabling identification (specifying) of a failed current sensor at time of failure detection.

Further, Patent Document 2 discloses a technique in which switching elements are provided on the high side and the low side as an inverter for driving a brushless motor and a shunt resistor is incorporated in a current line through which a current from the low-side switching element flows.

The technique disclosed in this Patent Document 2 is arranged such that a current flowing through the low-side switching element is converted into a voltage signal via the shunt resistor and based on this voltage signal, a current flowing in each phase can be controlled.

DOCUMENTS OF PRIOR ART

Patent Document
Patent Document 1: Japanese Unexamined Patent Application Publication No. 2005-160136
Patent Document 2: Japanese Unexamined Patent Application Publication No. 2003-284374

OVERVIEW OF INVENTION

Problem to be Solved by Invention

In the case of a controlling device for a three-phase brushless motor including current sensors for measuring currents in the current lines of the respective three phases, an arrangement is provided for enabling decision of abnormality in the switching elements, the motor, etc. based on the sensed current values and enabling also abnormality in the current sensors per se.

In such arrangement as the one disclosed in Patent Document 1 wherein current sensors are provided in wires used for supplying power from the inverter device to the AC generator, a current flowing through the high-side switching element is detected directly. So, this allows not only decision of abnormality in the high-side switching element, but also decision of abnormality in the low-side switching element. However, as the Patent Document 1 technique employs expensive hall-effect sensors as its current sensors, the technique tends to invite cost increase.

Incidentally, in the arrangement of Patent Document 1 using the current sensors, it will be most desirable to provide the current sensor in each phase, for acquiring ability to detect a current flowing in each phase with high accuracy. However, such arrangement providing a current sensor in each phase would invite further cost increase.

The arrangement of e.g. Patent Document 2 including a shunt resistor between a low-side switching element and the GND allows high accuracy detection of a value of current flowing in each phase and allows also cost reduction. However, as this shunt resistor detects a current from the low-side switching element, the higher the duty ratio of the high-side switching element, the shorter the period of the current flowing in the shunt resistor, thus leading to deterioration in the measurement accuracy of current value.

For these reasons, there remains a need for a controlling device that allows decision of abnormality in a switching element without impairing the advantage of using a shunt resistor.

Means for Solving Problem

According to a characterizing feature of the present invention, there is proposed a motor controlling device comprising:

a high-side first switching element corresponding to each phase of a three-phase brushless motor;

a low-side second switching element corresponding to each phase;

a shunt resistor disposed between and connected to the second switching element and a grounding line;

a power controlling section for controlling the first switching element and the second switching element; and a decision section configured to effect abnormality decision based on a sum of values of currents flowing in the shunt resistors of all the phases acquired by using the power controlling section to switch OFF the first switching element of any one phase whose duty ratio is found equal to or greater than a threshold value for a predetermined period and also to switch ON the second switching element of the same one phase for the predetermined period.

With the above-described characterizing feature, when a duty ratio of the first switching element in any phase is equal to or greater than a threshold value, the power controlling section switches OFF the first switching element of this phase for a predetermined period and switches ON the second switching element of this phase for the predetermined period at the same time, thereby to acquire a value of current flowing in the shunt resistor of this phase and to acquire also values of currents flowing in the shunt resistors of the other two phases. Then, the decision section effects abnormality decision based on a sum of these current values. Namely, with a three-phase brushless motor, the sum of values of currents flowing in the respective phases is always "0" (zero). Thus, abnormality decision can be realized by acquiring a sum of values of currents flowing in three shunt resistors and comparing this sum with the value "0" (zero).

Further, with the above-described arrangement, in a situation where the duty ratio of the first switching element is equal to or greater than the threshold value, power supply is stopped only for a short period of time. So, no torque reduction in the motor is invited. Further, the accuracy of decision is improved compared with an arrangement of estimating a current value of one phase from values of currents flowing in the shunt resistors in the other two phases, so that it becomes also possible to acquire a high switching output effective value and high-speed abnormality decision as well.

Therefore, it has become possible to configure a controlling device that allows also decision of abnormality in a switching element to which a shunt resistor is not directly connected, without impairing the advantage of using a shunt resistor.

As an alternative arrangement, the decision section can be configured to acquire values of currents flowing in the shunt resistors of all the three phases and to effect the abnormality decision based on a sum of these current values, if the duty of the first switching element is below the threshold value.

With the above-described arrangement, if the duty ratio of the first switching element is below the threshold value, abnormality decision can be made based simply on a sum of the values of currents flowing in all of the first switching elements, all of the second switching elements and the motor, without any special controlling of the switching elements.

As an alternative arrangement, the decision section may be configured to effect the abnormality decision for each abnormality detection cycle.

With the above-described arrangement, in comparison with an arrangement of effecting abnormality decision continuously, the frequency of decision can be reduced, so that the load on the control system can be reduced.

EMBODIMENT

Next, an embodiment of the present invention will be explained with reference to the accompanying drawings.

[Basic Arrangement]

Figure 1:
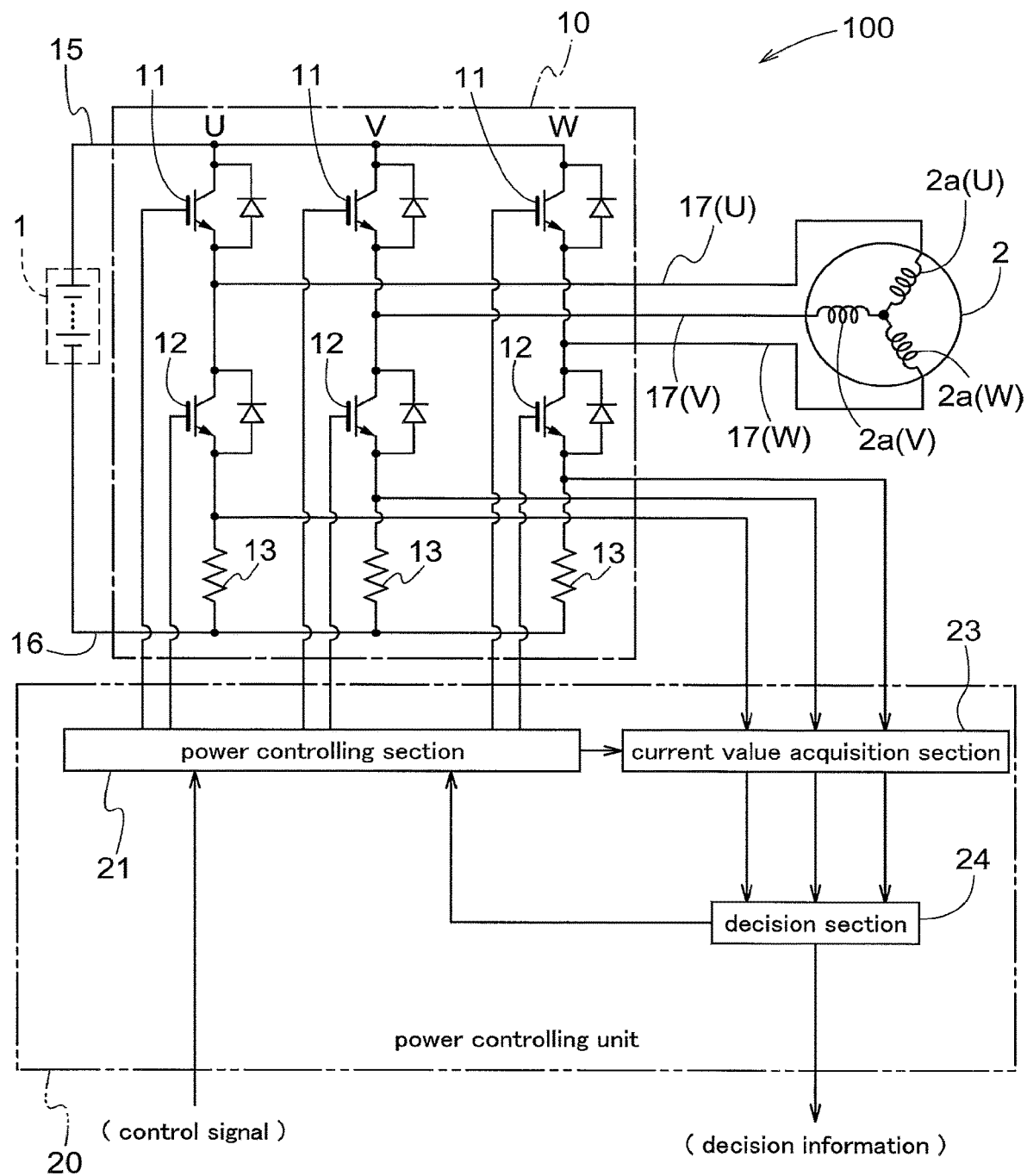
FIG. 1 is a view showing a circuit configuration of a motor controlling device.

As shown in FIG. 1, a motor controlling device 100 is configured of an inverter circuit 10 that converts power of a DC power source 1 into three-phase AC power and supplies this AC power to a three-phase brushless motor 2 (to be referred to simply as "motor 2" hereinafter) and a power control unit 20 for controlling the inverter circuit 10.

The inverter circuit 10 includes high-side three first switching elements 11 corresponding to the respective phases of the motor 2, low-side three second switching elements 12 corresponding to the respective phases of the motor 2 and three shunt resistors 13 for converting currents flowing in the respective phases into voltage signals individually.

The power control unit 20 controls the inverter circuit 10 based on control signals also acquires current values from the voltage signals of the three shunt resistors 13 and effects abnormality decision of each phase based on these current values and outputs decision information.

[Inverter Circuit]

As shown in FIG. 1, the inverter circuit 10 includes a power line 15 connected to the positive electrode of the DC power source 1, a GND (ground) line 16 connected to the negative electrode (GND side) of the DC power source 1 and three current lines 17 connected to the respective phases of the motor 2. The current lines 17 correspond to the U phase, the V phase and W phase, respectively and these current lines 17 are conducted to three field coils 2a corresponding to the U phase, the V phase and the W phase in the motor 2.

In the same figure, the high-side three first switching elements 11, the low-side three second switching elements 12 and the three shunt resistors 13 are shown in correspondence with the U phase, the V phase and the W phase. Respective emitter terminals of the first switching elements 11 corresponding to the U phase, the V phase and the W phase are connected to the current lines 17 of the U phase, the V phase and the W phase, respectively. Likewise, respective connector terminals of the second switching elements 12 corresponding to the U phase, the V phase and the W phase are connected to the current lines 17 of the U phase, the V phase and the W phase, respectively.

Moreover, the respective emitter terminals of the second switching elements 12 corresponding to the U phase, the V phase and the W phase are connected to one-side terminals of the shunt resistors 13 and the other-side terminals of the respective shunt resistors 13 are connected to the GND line 16.

Incidentally, although FIG. 1 shows the three second switching elements 12 and the three shunt resistors 13 in correspondence with the U phase, the V phase and the W phase respectively, it is noted that at time of driving of the first switching elements 11, a current does not flow simultaneously in the second switching element 12 and the shunt resistor 13 shown belonging in a same phase.

Further, in the inverter circuit 10 shown in the same figure, IGBT's (Insulated Gate Bipolar Transistors) are shown as the switching elements. However, power MOSFET's or power transistors can be employed instead.

[Power Control Unit]

The power control unit 20 includes a power controlling section 21, a current value acquisition section 23 and a decision section 24.

In this arrangement, the power controlling section 21 and the current value acquisition section 23 are comprised of hardware constituted of semiconductors. Whereas, the decision section 24 will be comprised of either software alone or combination of software and hardware.

Figure 4:
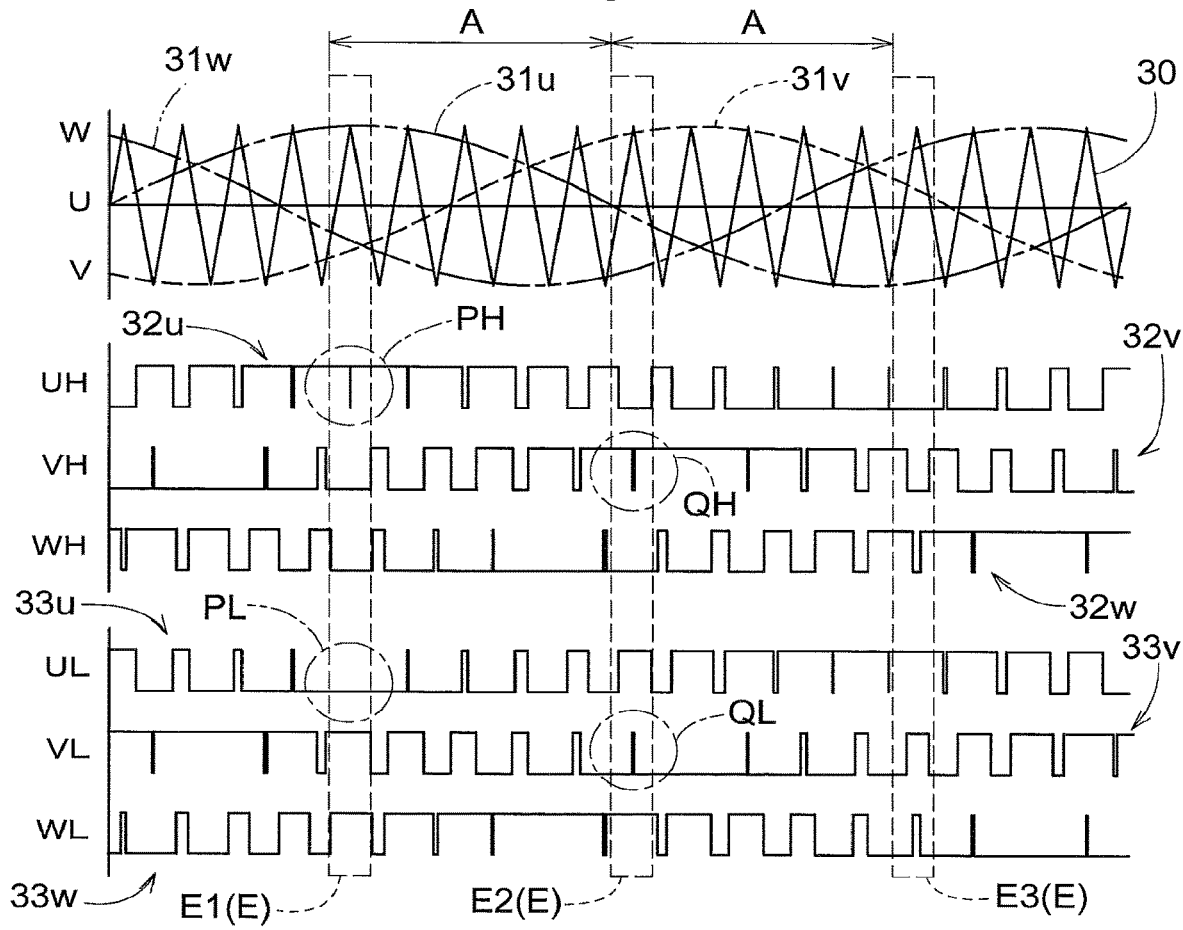
FIG. 4 is a timing chart showing control signals.
Figure 5:
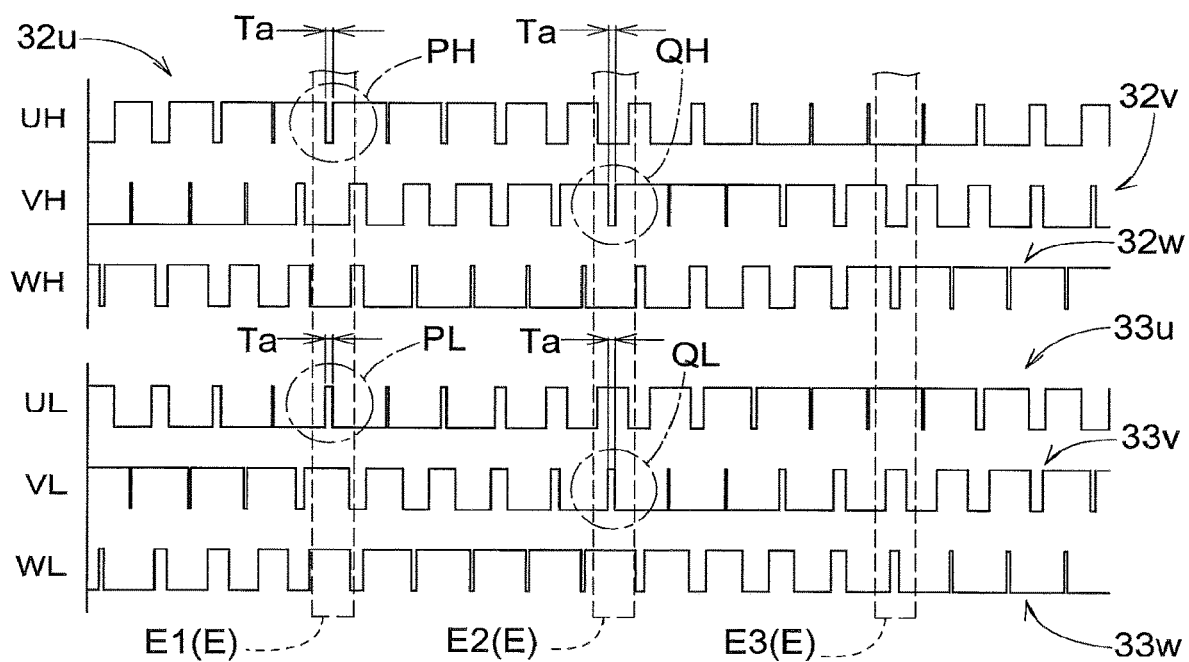
FIG. 5 is a timing chart showing waveforms when current values of three phases are acquired.

The power controlling section 21, as shown in FIG. 4 and FIG. 5, includes an oscillation circuit for generating a carrier triangular wave 30, and a PWM wave generation circuit for generating PWM signals 32, 33 (generic concept of 32$u$, 32$v$, 32$w$ and 33$u$, 33$v$, 33$w$, respectively). Through comparison of voltage magnitude between the carrier triangular wave 30 and respective instruction signals 31$u$, 31$v$, 31$w$, the PWM signals 32$u$, 32$v$, 32$w$ and 33$u$, 33$v$, 33$w$ are generated; and as driving signals, the PWM signals 32$u$, 32$v$, 32$w$ are outputted to the three first switching elements 11 and the PWM signals 33$u$, 33$v$, 33$w$ are outputted to the three second switching elements 12. This power controlling section 21 sets duty ratios of the PWM signals 32, 33 based on the control signals and as a result of such setting, setting of the motor torque of the motor 2 is realized.

The current value acquisition section 23 encodes a voltage signal converted by the shunt resistor 13 by A/D conversion and then outputs the resultant encoded signal as a current value (an encoded current value).

Further, the current value acquisition section 23 sets an acquisition timing for acquiring the current value based on a timing signal acquired from the power controlling section 21.

The decision section 24, as shown in FIG. 4, is set with a control mode for abnormality decision control so as to effect abnormality decision at a decision timing E (generic concept of decision timings: E1-E3) set for each abnormality detection cycle A. Further, in this abnormality decision control, the abnormality decision is effected based on an absolute value of a sum of current values acquired via the three shunt resistors 13.

This abnormality decision decides not only abnormality in the inverter circuit 10 including all the first switching elements 11, all the second switching elements 12, but also abnormality in the motor 2.

[Mode of Control]

Figure 2:
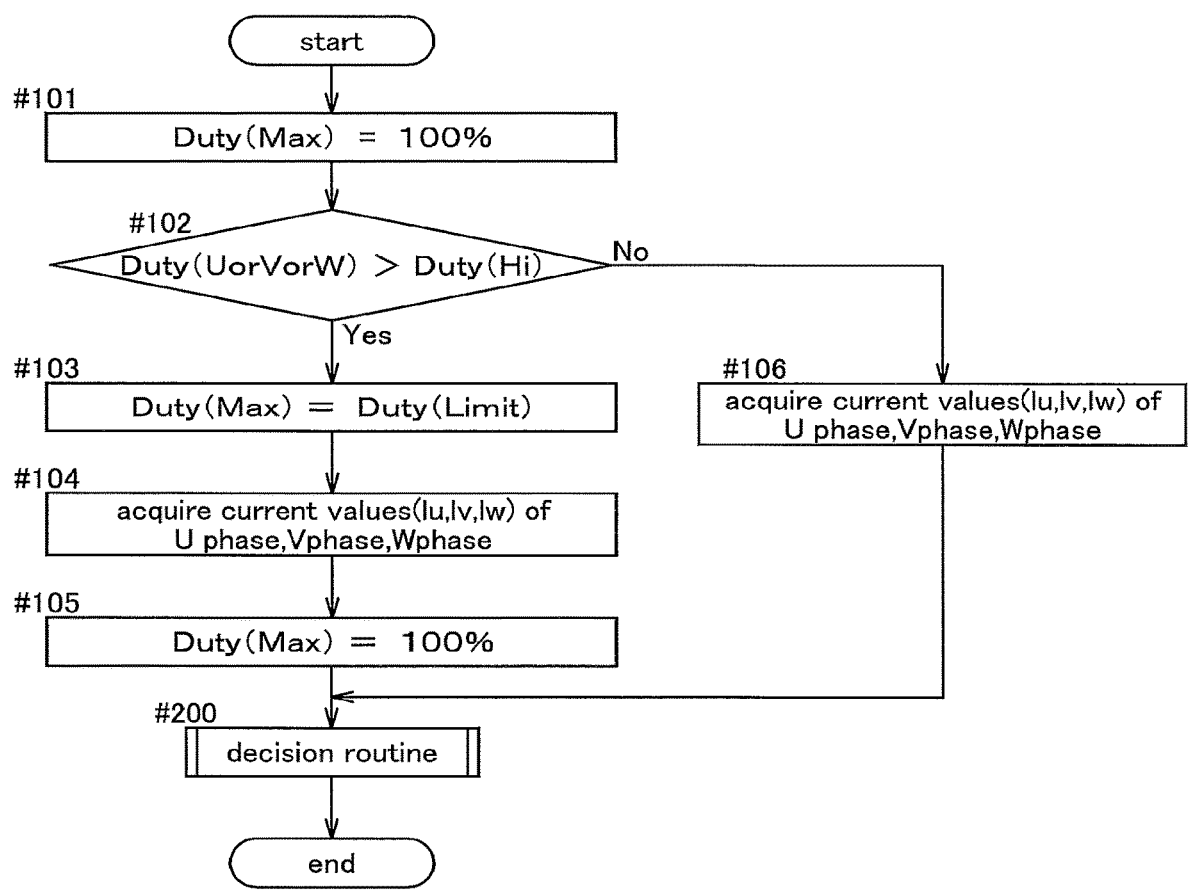
FIG. 2 is a flowchart showing a mode of control.
Figure 3:
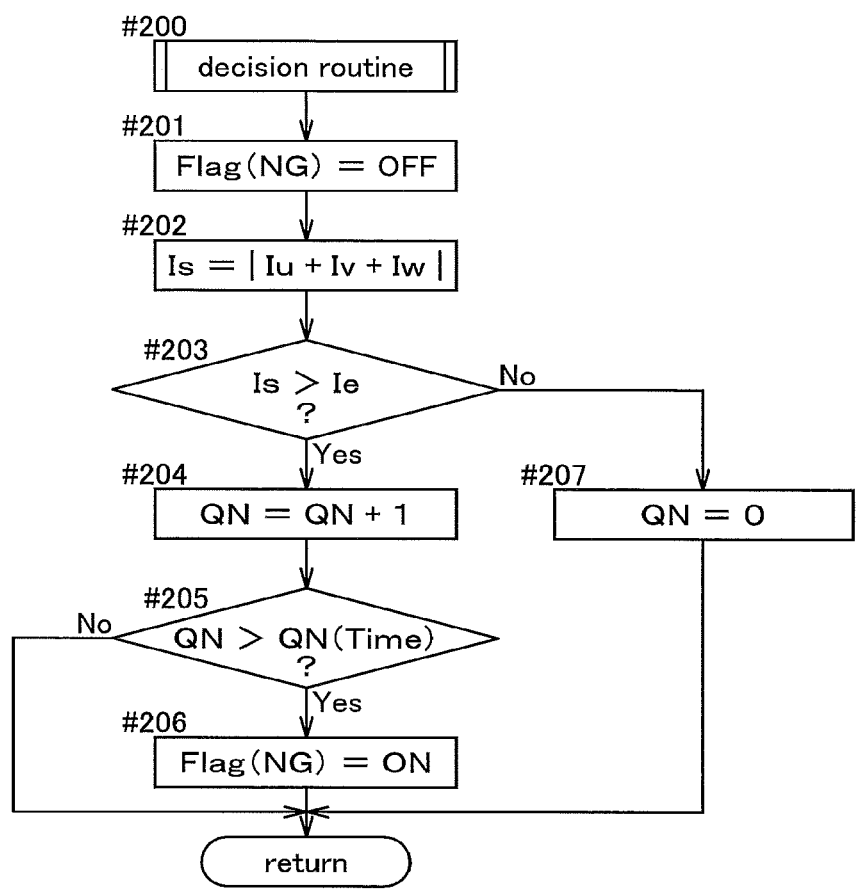
FIG. 3 is a flowchart of a decision routine.

The gist of the abnormality decision control in the decision section 24 is shown in the flowcharts of FIG. 2 and FIG. 3. In these flowcharts, the duty ratio of the respective PWM signals 32$u$, 32$v$, 32$w$ outputted to the first switching elements 11 is shown as "Duty". Further, in the timing charts shown in FIG. 4 and FIG. 5, there are shown waveforms before/after the abnormality decision control in the decision section 24. Incidentally, the duty ratio is a ratio of ON period relative to one cycle of the signal. For instance, like the PWM signals 32$u$, 32$v$, 32$w$ shown in FIG. 4, it can be represented by ON period and OFF period along the horizontal axis (time axis).

In the timing chart shown in FIG. 4, the carrier triangular wave 30 and the voltage instructing sine wave are shown in the upper column. In the middle column thereof, the PWM signals 32 (generic concept of 32$u$, 32$v$, 32$w$: driving signals) for driving the first switching elements 11 of the respective U phase, V phase and W phase are shown; and in the lower column, the PWM signals 33 (generic concept of 33$u$, 33$v$, 33$w$: driving signals) for driving the second switching elements 12 of the respective U phase, V phase and W phase are shown.

In the middle column, a sign: UH represents the driving signal for the U-phase first switching element 11, a sign: VH represents the driving signal for the V-phase first switching element 11, and a sign: WH represents the driving signal for the W-phase first switching element 11. Similarly, in the lower column, a sign: UL represents the driving signal for the U-phase second switching element 12, a sign: VL represents the driving signal for the V-phase second switching element 12, and a sign: WL represents the driving signal for the W-phase second switching element 12.

In the timing chart of FIG. 5, those corresponding to the middle column and the lower column in the timing chart of FIG. 4 are shown.

Further, the decision section 24, as shown in FIG. 4, is set with an interval of e.g. 1 msec. approximately as the abnormality detection cycle A. In the power control unit 20, the frequency of the carrier triangular wave 30 is fixed and in the abnormality decision cycle, decision timings E (generic concept of decision timings: E1-E3) will be set at the peaks of the carrier triangular wave 30 or at the vicinities of these peaks.

In particular, in the power controlling section 21, through voltage value comparison between the carrier triangular wave 30 and the instruction signal 31$u$, 31$v$, 31$w$ provided as a sine wave, the PWM signals as driving signals for the first switching elements 11 and the second switching elements 12 are determined. Namely, in the instant embodiment, the power controlling section 21 is configured such that the second switching element 12 is switched ON if the voltage value of the carrier triangular wave 30 is greater than the voltage value of the sine wave of the instruction signal 31$u$, 31$v$, 31$w$.

In this abnormality decision control, preferably, the second switching element 12 is switched ON at the decision timing E in order to acquire a value of current flowing in the shunt resistor 13 in the situation of the second switching element 12 being ON. For this reason, in order to increase the possibility of the second switching element 12 being under the ON state, the decision timings E are set at the peaks (upwardly convex peaks) of the carrier triangular wave 30 or adjacent these peaks.

FIG. 2 illustrates the abnormality decision control executed upon reaching the decision timing E. In this control, as an initial setting, elimination of limitation of the PWM signals (namely, Duty (Max)=100%) is set (step #101).

Next, in order to acquire current values flowing in the high-side first switching elements 11, duty ratios: Duty (U, V, W) corresponding to the U phase, the V phase and the W phase are acquired and these Duty values and the Duty (Hi) are compared with each other (step #102).

At step #101, by setting the upper limit (Duty (Max)) to 100%, limitations on the currents flowing in the first switching elements 11 of the respective phases are eliminated. Further, at step #102, comparison between the Duty (U, V, W) of each phase and the Duty (Hi) as a threshold value is executed. Incidentally, this Duty (Hi) is set to a large value such as 90% or the like.

Next, if it is decided that the Duty of any phase (U, V, W) corresponding to the U phase, the V phase, the W phase is greater than the Duty (Hi) (YES at step #102), the Duty (Max) of the Hi phase is set to the minimal value Duty (Limit), thus setting the first switching element 11 of the Hi phase to OFF state and in synchronism therewith, the second switching element 12 of the same phase is set to ON state. With this, values of currents (Iu, Iv, Iw) flowing in the shunt resistors 13 of the U phase, the V phase, and the W phase can be obtained at one time, so the process proceeds to a decision routine. Thereafter, the first switching element 11 of the Hi phase is returned to ON state and the second switching element 12 is returned to OFF state (steps #103-#105, #200).

In case the abnormality decision is executed at decision timing E1, as shown in FIG. 4, at this decision timing E1, it is decided that based on driving signals VL, WL, the second switching elements 12 of the V phase and the W phase are under ON state. However, since it is decided that based on a driving signal UL in a region PL, the second switching element 12 of the U phase is under OFF state and based on a driving signal UH of a region PH corresponding thereto, the first switching element 11 of the U phase has a very short OFF state period in the ON state.

In such a situation as described above, it is not possible to acquire a current value Iu flowing in the shunt resistor 13 of the U phase. So, at step #103, as shown in FIG. 5, limitedly only for a predetermined period Ta (e.g. about several micro seconds) when current value acquisition is possible in the region PL, the driving signal UL is rendered ON and in synchronization therewith the driving signal UH of the region PH is rendered OFF only for this predetermined period Ta. With this control, limitedly for this predetermined period Ta, a current flows from the second switching element 12 of the U phase to the shunt resistor 13 and in synchronization therewith power supply to the first switching element 11 is blocked. In this way, simultaneous acquisition of current values of the three phases is realized.

Similarly to the above, in case the abnormality decision is executed at decision timing E2, as shown in FIG. 4, at this decision timing E2, it is decided that based on driving signals UL, WL, the second switching elements 12 of the U phase and the W phase are under ON state. However, it is decided that based on a driving signal VL in a region QL, the first switching element 11 of the V phase has a very short OFF state period in the ON state. And, based on a driving signal VH of a region QH corresponding thereto, it is decided that the first switching element 11 of the V phase has a very short OFF state period in the ON state.

In such a situation as described above, it is not possible to acquire a current value Iv flowing in the shunt resistor 13 of the V phase. So, at step #103, as shown in FIG. 5, limitedly only for a predetermined period Ta (e.g. about several micro seconds) when current value acquisition is possible in the region QL, the driving signal VL is rendered ON and in synchronization therewith the driving signal VH of the region QH is rendered OFF only for this predetermined period Ta. With this control, limitedly for this predetermined period Ta, a current flows from the second switching element 12 of the V phase to the shunt resistor 13 and in synchronization therewith power supply to the first switching element 11 is blocked. In this way, simultaneous acquisition of current values of the three phases is realized.

In particular, at decision timing E2, the durations of the OFF state of the driving signal VH in the region QH and the ON state of the driving signal VL are extremely short, so current value acquisition is difficult. For this reason, the durations of the OFF state of the driving signal VH and the ON state of the driving signal VL in the region QL are extended to the predetermined period Ta respectively, thus enabling acquisition of the current value Iv.

Further, by setting the upper limit Duty (Max) to 100% at step #105, the first switching element 11 which has been rendered OFF is returned to the previous controlled OFF state.

For instance, in case the abnormality decision control is executed at decision timing E1, the current supplied from the U phase first switching element 11 to the motor 2 is blocked for the predetermined period Ta. But, immediately before this blocking, a current is supplied from the U phase first switching element 11 to the motor 2, so a magnetic field is generated in the field coil 2a of the motor 2.

Thus, when the U phase first switching element 11 reaches the OFF state, the energy stored as a magnetic field in the field coil 2a of the motor 2 will be induced as a voltage and also a current is flown via the current line 17 of this U phase from the ON state second switching element 12 to the U phase shunt resistor 13, thus realizing current value acquisition.

Further, if it is decided at step #102 that Duty values of all the phases are below the Duty (Hi) (NO at step #102), values of currents (Iu, Iv, Iw) flowing in the U phase, V phase and W phase shunt resistors 13 are acquired and the process goes to the decision routine (steps #106, #200).

Further, at step #106, like the decision timing E3, if the second switching elements 12 of the V phase and the W phase are ON simultaneously based on the driving signals VL, WL, the current values of these will be acquired at one time.

As shown in FIG. 3, the decision routine (step #200) is realized by the decision section 24. In this decision routine, a Flag (NG) is set to OFF (Flag (N)=OFF). An absolute value of sum (Is=[Iu+Iv+Iw]) of values of currents flowing in the respective phases of the U phase, the V phase and the W phase is calculated and compared with the set value Ie (steps #201-#203).

Further, with a three-phase AC arrangement under an equilibrium, the sum of the values (instantaneous values) of currents flowing in the U phase, the V phase and the W phase is "0". Therefore, the set value Ie is set to a value near "0" and through comparison between this set value Ie and the absolute value Is of the sum of the current values (Iu, Iv, Iw), abnormality decision is effected. Incidentally, it would be ideal to set the set value Ie to "0". However, since an error may be present even if the currents flowing in the current lines 17 of the respective phases are under equilibrium, in actuality, the set value Ie is set to a value slightly greater than "0".

Next, if the absolute value Is of the sum of the values (Iu, Iv, Iw) of currents of the three phases is greater than the set value Ie, an added-up value QN is incremented (QN=QN+1) and then compared with a time value QN (Time) (steps #203-#205).

In this control, the above-described comparison between the added-up value QN and the time value QN (Time) as a set period is carried out for the purpose of determining a duration period of the state of the absolute value Is of the sum of the values (Iu, Iv, Iw) of currents flowing in the shunt resistors 13 of the three phases being greater than the set value Ie.

With the above comparison, if the added-up value QN exceeds the time value QN (Time) (YES at step #205), the Flag (NG) is set to ON (step #206).

Conversely, if the absolute value Is of the sum of the values (Iu, Iv, Iw) of currents flowing in the three phases is equal to or smaller than the set value Ie (NO at step #203), the added-up value QN is set to "0" (step #207). Further, if added-up value QN is smaller than the time value QN (Time), the Flag (NG) is maintained at OFF.

In case such abnormality information is set, abnormality information indicative of presence of abnormality in any one of the U phase, the V phase and the W phase will be stored in e.g. a memory of the power control unit 20 and outputted to e.g. a device for controlling the motor 2.

Based on this output, a process of outputting the above-described decision information will be executed. And, in case the abnormality information is set in the decision information, a process of displaying a message informing abnormality on a monitor, a process of outputting it as an alarm sound or a process of stopping the motor 2 according to a predetermined procedure will be carried out.

[Function/Effect of Embodiment]

In this way, the abnormality decision control is executed at the decision timing E set for each abnormality detection cycle A. And, if there is a situation of currents flowing simultaneously to the shunt resistors 13 of the three phases, current values of all the three phases will be acquired and based on a sum thereof, the abnormality decision will be realized.

Further, at time of arrival at the decision timing E, if there is a situation of a current not flowing in the second switching element 12 of any one of the three phases; then, if a Duty higher than the threshold value (Duty (Hi)) is set for this phase, the arrangement creates the situation of current flowing in the second switching element 12, so that current values of all the three phases will be acquired and based on the sum thereof, abnormality decision will be realized.

In this way, in a situation of large current being supplied to the motor 2 for causing its high-torque rotation, the decision section 24 will set the first switching element 11 to OFF for the predetermined period Ta only, but as the duration of this predetermined period Ta is short, the acquisition of current value is realized without inviting reduction in the torque of the motor 2.

Further, in case the decision section 24 effects decision in a situation of the Duty of all the phases being equal to or smaller than Duty (Hi), current values flowing in the current lines 17 of the respective phases will be acquired and based on a sum thereof, the decision will be effected. With this, comprehensive abnormality decision including all the first switching elements 11, all the second switching elements 12 and the motor 2 can be effected without inviting torque reduction.

Further, when decision is to be made, the decision is always effected based on a sum of values of currents flowing in the shunt resistors 13 of all the three phases. Therefore, in comparison with an arrangement of estimating a current value of one phase from current values flowing in the shunt resistors 13 of the other two phases, accuracy of the decision is improved, so that it becomes also possible to acquire a high switching output effective value and high-speed abnormality decision as well.

And, in the decision section 24, by setting the abnormality information in the decision information, a process of displaying a message informing abnormality on a monitor, a process of outputting it as an alarm sound or a process of stopping the motor 2 according to a predetermined procedure will be carried out, whereby inconvenience of operating the motor 2 under an abnormal state can be suppressed.

As this arrangement employs the shunt resistors 13, thus, in comparison with an arrangement wherein current values of current lines 17 are acquired in non-contact manner with use of hall-effect elements, the arrangement can be made inexpensive, so cost increase can be suppressed.

Other Embodiments

The foregoing embodiment employed the control mode in which when it is decided at step #102 that Duty of any one of the phases (U, V, W) corresponding to the U phase, the V phase and the W phase is greater than Duty (Hi), the process moves on to step #103. Instead, it is also possible to set a control mode for effecting control for eliminating influence of noise, etc.

Namely, in this case, if it is decided that Duty of any one of the phases (U, V, W) corresponding to the U phase, the V phase and the W phase is greater than Duty (Hi), the count value CN of this phase (Hi phase) is incremented (CN=CN+1) and then compared with the time value CN (Time). And, if the count value CN is greater than the time value CN (Time), the process moves on to the subsequent control.

By effecting such control as above, it becomes possible to effect appropriate control with avoidance of inconvenience that Duty of any one of the phases (U, V, W) is erroneously decided to be greater than Duty (Hi). In particular, by setting the time value CN (Time) to a sufficiently large value, appropriate control can be realized.

In connection with the above, in the control mode of the foregoing embodiment, when it is decided at step #102 that Duty of any one of the phases (U, V, W) corresponding to the U phase is smaller than Duty (Hi), the process moves on to step #106. In this control too, it is also possible to set a control mode for effecting control for eliminating influence of noise, etc.

Namely, in this case, if it is decided that Duty of all the phases are smaller than Duty (Hi), the count value CN is decremented (CN=CN−1). And, when the decremented count value CN reaches "0", the process moves onto the subsequent control.

By effecting such control as above, it becomes possible to effect appropriate control with avoidance of inconvenience that Duty values of all the phases are erroneously decided to be smaller than Duty (Hi). In this control, instead of decrementing the count value CN, it is possible to set a variable different from the count value CN and to increment this variable.

INDUSTRIAL APPLICABILITY

The present disclosure can be applied to a motor controlling device for controlling power supply to respective phases of a three-phase brushless motor.

EXPLANATION OF REFERENCE NUMERALS

2: three-phase brushless motor
11: first switching element
12: second switching element
13: shunt resistor
21: power controlling section
24: decision section
Ta: predetermined period

The invention claimed is:

1. A motor controlling device comprising:
a high-side first switching element corresponding to each phase of a three-phase brushless motor;
a low-side second switching element corresponding to each phase;
a shunt resistor disposed between and connected to the second switching element and a grounding line; and
a circuitry configured to
control the first switching element and the second switching element, and
effect abnormality decision based on a stun of values of currents flowing in the shunt resistors of all the phases acquired by switching OFF the first switching element of any one phase whose duty ratio is found equal to or greater than a threshold value for a predetermined period and switching ON the second switching element of the same one phase for the predetermined period,
wherein when the duty ratio of the first switching element is below the threshold value, the circuitry is configured to acquire values of currents flowing in the shunt resistors of all the three phases and to effect the abnormality decision based on a sum of the current values.

2. The motor controlling device of claim 1, wherein the circuitry is configured to effect the abnormality decision for each abnormality detection cycle.

* * * * *